United States Patent
Zhang et al.

(10) Patent No.: US 11,507,511 B2
(45) Date of Patent: Nov. 22, 2022

(54) METHOD, ELECTRONIC DEVICE AND COMPUTER PROGRAM PRODUCT FOR STORING DATA

(71) Applicant: EMC IP Holding Company LLC, Hopkinton, MA (US)

(72) Inventors: Leihu Zhang, Beijing (CN); Chen Gong, Beijing (CN); Shuo Lv, Beijing (CN)

(73) Assignee: EMC IP Holding Company LLC, Hopkinton, MA (US)

(*) Notice: Subject to any disclaimer, the term of this patent is extended or adjusted under 35 U.S.C. 154(b) by 60 days.

(21) Appl. No.: 16/937,870

(22) Filed: Jul. 24, 2020

(65) Prior Publication Data

US 2021/0318959 A1    Oct. 14, 2021

(30) Foreign Application Priority Data

Apr. 9, 2020 (CN) .......................... 202010272914.9

(51) Int. Cl.
*G06F 12/0815* (2016.01)
*G06F 12/0804* (2016.01)

(52) U.S. Cl.
CPC ...... *G06F 12/0815* (2013.01); *G06F 12/0804* (2013.01); *G06F 2212/1021* (2013.01)

(58) Field of Classification Search
CPC ............. G06F 12/0815; G06F 12/0804; G06F 2212/1021
See application file for complete search history.

(56) References Cited

U.S. PATENT DOCUMENTS

| | | | |
|---|---|---|---|
| 5,652,857 A * | 7/1997 | Shimoi | G06F 3/0601 710/68 |
| 5,974,421 A * | 10/1999 | Krishnaswamy | G06F 12/0802 |
| 8,972,672 B1 * | 3/2015 | Wallace | G06F 3/0641 707/693 |
| 9,026,740 B1 * | 5/2015 | Shilane | G06F 11/1453 711/216 |
| 9,122,697 B1 | 9/2015 | Bono et al. | |
| 10,387,066 B1 | 8/2019 | Gonczi et al. | |
| 10,503,516 B1 * | 12/2019 | Faibish | G06F 3/061 |
| 10,579,593 B2 | 3/2020 | Bassov et al. | |
| 10,795,596 B1 | 10/2020 | Shabi et al. | |
| 10,838,643 B2 | 11/2020 | Faibish et al. | |
| 10,891,261 B2 | 1/2021 | Zhang et al. | |
| 10,936,228 B2 | 3/2021 | Gonczi et al. | |
| 2003/0005036 A1 * | 1/2003 | Mitzenmacher | H04L 67/2852 709/203 |

(Continued)

*Primary Examiner* — Prasith Thammavong
(74) *Attorney, Agent, or Firm* — BainwoodHuang

(57) ABSTRACT

Techniques for storing data involve estimating a hit ratio of a digest cache associated with a target storage device, the digest cache recording a digest of data that is stored in the target storage device after preprocessing; generating, according to a determination that the hit ratio is lower than a predetermined threshold, a digest for target data to be stored and performing the preprocessing; and storing, according to a determination that the digest of the target data is missing in the digest cache, the preprocessed target data in the target storage device, and recording the digest of the target data in the digest cache. Such techniques can achieve good system performance in both cases of high data repetition and low data repetition.

17 Claims, 3 Drawing Sheets

(56) References Cited

U.S. PATENT DOCUMENTS

| | | | |
|---|---|---|---|
| 2007/0005901 A1* | 1/2007 | Kellar | G06F 12/0886 |
| | | | 711/137 |
| 2009/0106486 A1* | 4/2009 | Kim | G11C 16/349 |
| | | | 711/103 |
| 2009/0268903 A1* | 10/2009 | Bojinov | G06F 11/1453 |
| | | | 713/189 |
| 2014/0108362 A1* | 4/2014 | Kim | H03M 7/3084 |
| | | | 707/693 |
| 2015/0066865 A1* | 3/2015 | Yara | G06F 16/21 |
| | | | 707/667 |
| 2015/0066866 A1* | 3/2015 | Yara | G06F 16/2365 |
| | | | 707/687 |
| 2016/0162218 A1* | 6/2016 | Callaway | G06F 3/0608 |
| | | | 707/692 |
| 2019/0266267 A1* | 8/2019 | Ma | G06F 16/2255 |
| 2020/0019329 A1* | 1/2020 | Faibish | G06F 12/0804 |
| 2020/0042218 A1* | 2/2020 | Faibish | G06F 3/0608 |
| 2020/0174939 A1* | 6/2020 | Nair | G06F 12/0864 |
| 2021/0258020 A1* | 8/2021 | Yamagiwa | H03M 7/42 |

* cited by examiner

METHOD, ELECTRONIC DEVICE AND COMPUTER PROGRAM PRODUCT FOR STORING DATA

CROSS-REFERENCE TO RELATED APPLICATION

This application claims priority to Chinese Patent Application No. CN202010272914.9, on file at the China National Intellectual Property Administration (CNIPA), having a filing date of Apr. 9, 2020, and having "METHOD, ELECTRONIC DEVICE AND COMPUTER PROGRAM PRODUCT FOR STORING DATA" as a title, the contents and teachings of which are herein incorporated by reference in their entirety.

TECHNICAL FIELD

Embodiments of the present disclosure generally relate to the field of data storage, and in particular, to a method, an apparatus, and a computer program product for storing data.

BACKGROUND

Generally, before data is stored in a storage device, compression and deduplication operations may be performed on the data to save the required storage space. The compression and deduplication operations are usually carried out according to the following procedure. First, a digest (e.g., a hash value) of data to be stored is calculated, and the calculated digest is compared with digests of data that have been stored in the storage device. If the calculated digest does not match all the digests of stored data, the data to be stored will be compressed and the compressed data will be stored to the storage device. In addition, the calculated digest will be added to the digests of the stored data for next comparison. If the calculated digest matches one digest of the stored data, it indicates that the data has been stored in the storage device, and therefore, there is no need to perform a compression operation.

The above procedure of compression and deduplication operations can avoid performing unnecessary compression operations in the case of high data repetition, thereby achieving good system performance. However, the above procedure of compression and deduplication operations may adversely affect the system performance in the case of low data repetition.

SUMMARY OF THE INVENTION

A method, an apparatus, and a computer program product for storing data are provided in embodiments of the present disclosure.

In a first aspect of the present disclosure, a method for storing data is provided. The method includes: estimating a hit ratio of a digest cache associated with a target storage device, the digest cache recording a digest of data that is stored in the target storage device after preprocessing; generating, according to a determination that the hit ratio is lower than a predetermined threshold, a digest for target data to be stored and performing the preprocessing; and storing, according to a determination that the digest of the target data is missing in the digest cache, the preprocessed target data in the target storage device, and recording the digest of the target data in the digest cache.

In a second aspect of the present disclosure, an electronic device is provided. The electronic device includes at least one processing unit and at least one memory. The at least one memory is coupled to the at least one processing unit and stores instructions for execution by the at least one processing unit. When executed by the at least one processing unit, the instructions cause an apparatus to perform actions including: estimating a hit ratio of a digest cache associated with a target storage device, the digest cache recording a digest of data that is stored in the target storage device after preprocessing; generating, according to a determination that the hit ratio is lower than a predetermined threshold, a digest for target data to be stored and performing the preprocessing; and storing, according to a determination that the digest of the target data is missing in the digest cache, the preprocessed target data in the target storage device, and recording the digest of the target data in the digest cache.

In a third aspect of the present disclosure, a computer program product is provided. The computer program product is tangibly stored in a non-transitory computer-storage medium and includes machine-executable instructions. When executed by a device, the machine-executable instructions cause the device to perform any step of the method described according to the first aspect of the present disclosure.

The summary is provided to introduce the choice of concepts in a simplified form, which will be further described in the following Detailed Description. The summary is neither intended to identify key features or necessary features of the present disclosure, nor intended to limit the scope of the present disclosure.

BRIEF DESCRIPTION OF THE DRAWINGS

The above and other objectives, features, and advantages of the present disclosure will become more obvious by describing example embodiments of the present disclosure in more detail with reference to the accompanying drawings. In the example embodiments of the present disclosure, the same reference numerals generally represent the same members.

Identical or corresponding numerals represent identical or corresponding parts in various accompanying drawings.

DETAILED DESCRIPTION

Figure 1:
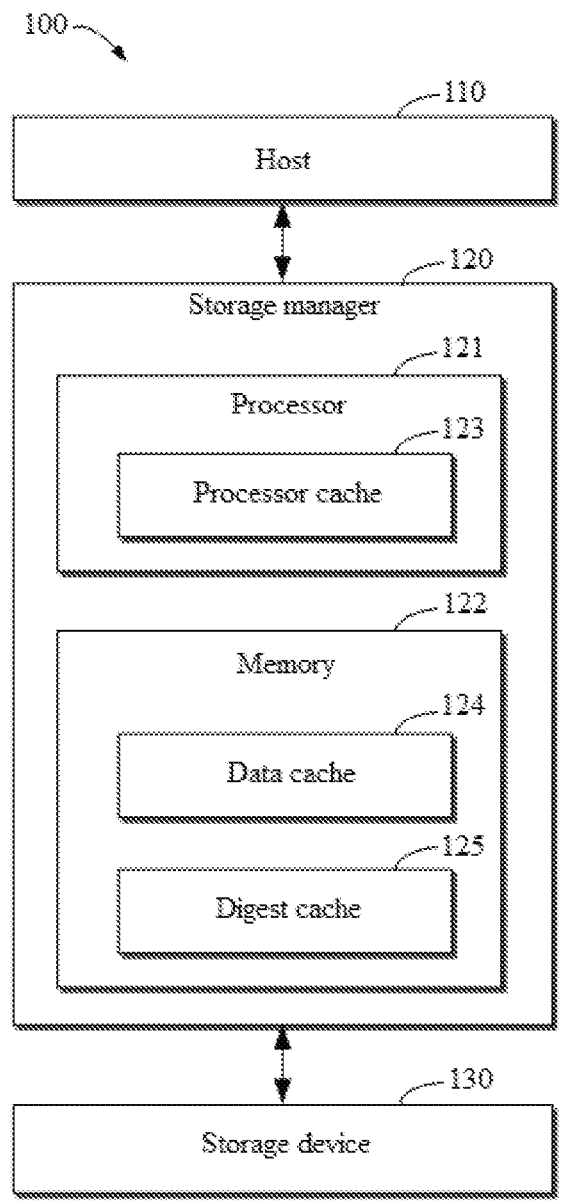
FIG. 1 is a schematic diagram of an example system in which an embodiment of the present disclosure can be implemented.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Preferred embodiments of the present disclosure will be described in more detail below with reference to the accompanying drawings. It should be understood that, although preferred embodiments of the present disclosure are illustrated in the accompanying drawings, the present disclosure may be implemented in various forms and should not be limited by the embodiments illustrated herein. Rather, these embodiments are provided to make the present disclosure more thorough and complete, and will fully convey the scope of the present disclosure to those skilled in the art.

The term "include" and variants thereof as used herein are intended to be open-ended, i.e., "including but not limited to." Unless specifically stated, the term "or" means "and/or." The term "based on" means "based at least in part on." The terms "one example embodiment" and "one embodiment" mean "at least one example embodiment." The term "another embodiment" means "at least one additional embodiment." The terms "first," "second," etc. may refer to different or identical objects. Other explicit and implicit definitions may also be included below.

As described above, before data is stored in a storage device, compression and deduplication operations may be performed on the data to save the required storage space. The compression and deduplication operations are usually carried out according to the following procedure. First, a digest (e.g., a hash value) of data to be stored is calculated, and the calculated digest is compared with digests of data that have been stored in the storage device. If the calculated digest does not match all the digests of stored data, the data to be stored will be compressed and the compressed data will be stored to the storage device. In addition, the calculated digest will be added to the digests of the stored data for next comparison. If the calculated digest matches one digest of the stored data, it indicates that the data has been stored in the storage device, and therefore, there is no need to perform a compression operation.

The above procedure of compression and deduplication operations can avoid performing unnecessary compression operations in the case of high data repetition, thereby achieving good system performance. However, the above procedure of compression and deduplication operations may adversely affect the system performance in the case of low data repetition.

Specifically, in the case of low data repetition, the calculated digest does not match any of the digests of the stored data in most cases, and therefore, the data to be stored needs to be compressed and then stored in the storage device. Both digest calculation and data compression require loading data from a memory to a processor cache for operation. Since there is a certain time interval between digest calculation and data compression, data may be swapped out from the processor cache after the digest calculation is completed, and as a result, the data needs to be reloaded from the memory to the processor cache for operation during subsequent data compression, which will adversely affect the system performance.

A solution for storing data is proposed in the embodiments of the present disclosure to solve the above problem and one or more of other potential problems. The solution can compress data while calculating a digest of the data in the case of low data repetition, thereby avoiding the operation of loading the same data from a memory to a processor cache multiple times. The solution can perform processing according to the conventional procedure of compression and deduplication operations in the case of high data repetition, thus avoiding unnecessary compression operations. As such, the solution can achieve good system performance in both cases of high data repetition and low data repetition.

FIG. 1 is a schematic diagram of example system 100 in which an embodiment of the present disclosure can be implemented. As shown in FIG. 1, system 100 includes host 110, storage manager 120, and storage device 130. It should be appreciated that the structure and function of system 100 are described for illustrative purposes only, and do not imply any limitation to the scope of the present disclosure. For example, the embodiments of the present disclosure may also be applied to a system different from system 100.

In system 100, host 110 may be, for example, any physical computer, virtual machine, server, and the like that runs a user application. Host 110 may send an input/output (I/O) request to storage manager 120, for example, for reading data from storage device 130 and/or writing data to storage device 130. In response to receipt of a read request from host 110, storage manager 120 may read data from storage device 130 and return the read data to host 110. In response to receipt of a write request from host 110, storage manager 120 may write data to storage device 130. Storage device 130 may be any non-volatile storage medium currently known or to be developed in the future, such as a magnetic disk, a solid state disk (SSD), or a disk array.

In order to save the space required for data storage, before data is written to storage device 130, storage manager 120 may perform preprocessing (e.g., compression) and deduplication operations on the data. As shown in FIG. 1, storage manager 120 may include processor 121 and memory 122. Memory 122 may be any volatile storage medium or non-volatile storage medium that is currently known or to be developed in the future, or a combination of both. Depending on the type of stored data, memory 122 may include data cache 124 and digest cache 125. Data cache 124 may temporarily store data to be written to storage device 130 (e.g., data from host 110). Digest cache 125 may record a digest of data that has been stored to storage device 130, thereby preventing duplicate data from being written into storage device 130. It should be appreciated that data cache 124 and digest cache 125 may be implemented using the same or different storage media. Examples of processor 121 may include, but are not limited to, a central storage unit (CPU), a graphics processing unit (GPU), a field programmable gate array (FPGA), and so on. Processor 121 may include high-speed cache 123 (also referred to as "processor cache 123" herein). When processor 121 intends to process (for example, generate a digest, compress data, etc.) the data in data cache 124, processor 121 may load the data in data cache 124 to processor cache 123 for operation.

Figure 2:
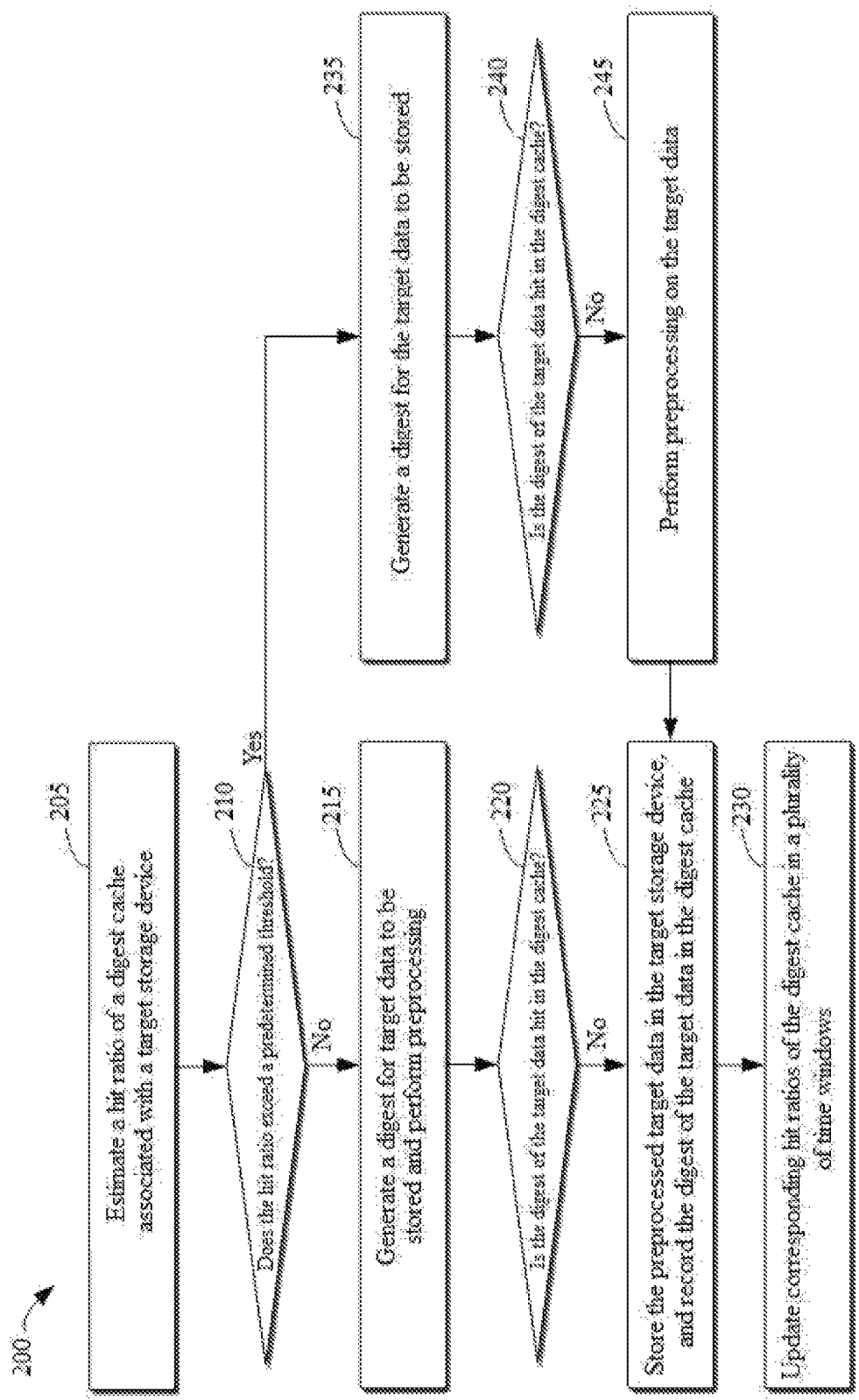
FIG. 2 is a flowchart of an example method for storing data according to an embodiment of the present disclosure.

FIG. 2 is a flowchart of example method 200 for storing data according to an embodiment of the present disclosure. Method 200 may be, for example, performed by storage manager 120 (e.g., processor 121) shown in FIG. 1. It should be appreciated that method 200 may also include additional actions not shown and/or omit the actions shown, and the scope of the present disclosure is not limited in this regard. Method 200 is described in detail below with reference to FIG. 1.

As shown in FIG. 2, in block 205, storage manager 120 estimates a hit ratio of digest cache 125 associated with target storage device 130. Digest cache 125 records a digest (for example, a hash value) of data that is stored in target storage device 130 after preprocessing. In some embodiments, the preprocessing may include compression. Additionally or alternatively, the pre-processing may include encryption and other operations.

In some embodiments, storage manager 120 may estimate the hit ratio of digest cache 125 based at least on corresponding hit ratios of digest cache 125 in a plurality of time windows. For example, the plurality of time windows may include at least a short time window and a long time window. In some embodiments, the short time window may be a historical time window of a predetermined time length before the current time (e.g., 30 minutes or 1 hour before the current time, and the like). The long time window may be a time window from the occurrence of an event (for example, system startup or creation of a corresponding logical storage unit) to the current time. It should be appreciated that the plurality of time windows may also include other historical time windows in addition to the above time windows.

In some embodiments, the plurality of time windows may be assigned with corresponding weights. Storage manager 120 may estimate the hit ratio of digest cache 125 based on the corresponding hit ratios of digest cache 125 in the plurality of time windows and the corresponding weights of the plurality of time windows. Taking two time windows, namely, a short time window and a long time window as an example, the hit ratio HitRatio of digest cache 125 can be calculated as follows:

$$HitRatio = Weight_{short} * HitRatio_{short} + (1 - Weight_{short}) * HitRatio_{long}$$

Where $Weight_{short}$ represents the weight of the short time window, $HitRatio_{short}$ represents the hit ratio (e.g., the average hit ratio) of the short time window, $(1-Weight_{short})$ represents the weight of the long time window, and $HitRatio_{long}$ represents the hit ratio of the long time window (e.g., the average hit ratio).

In block 210, storage manager 120 determines whether the estimated hit ratio exceeds a predetermined threshold.

If storage manager 120 determines in block 210 that the estimated hit ratio is lower than the predetermined threshold, it indicates that the data repetition may be low. In this case, in block 215, storage manager 120 generates a digest for target data to be stored and performs preprocessing. In some embodiments, storage manager 120 may read target data from memory 122 (e.g., data cache 124) to processor cache 123, and then generate a digest of the target data in processor cache 123 and perform preprocessing (for example, compression) on the target data. In some embodiments, digest generation and preprocessing may be performed in parallel. As such, the operation of loading the same data from memory 122 to processor cache 123 multiple times can be avoided in the case of low data repetition.

In block 220, storage manager 120 determines whether the digest of the target data is hit in digest cache 125. If storage manager 120 determines that the digest of the target data is missing in digest cache 125, in block 225, storage manager 120 stores the preprocessed target data in target storage device 130, and records the digest of the target data in digest cache 125. In block 230, storage manager 120 updates the corresponding hit ratios of digest cache 125 in the plurality of time windows based on a hit result of the digest of the target data in digest cache 125. Taking two time windows, namely, a short time window and a long time window as an example, in some embodiments, storage manager 120 may update the start time and the end time of each of the short time window and the long time window. Storage manager 120 may re-determine, for each updated time window, the hit ratio of digest cache 125 in the time window based on a hit result of the digest of the target data in digest cache 125.

If storage manager 120 determines in block 210 that the hit ratio exceeds a predetermined threshold, it indicates that the data repetition may be high. In this case, in block 235, storage manager 120 generates a digest for target data to be stored. In some embodiments, storage manager 120 may read the target data from memory 122 (e.g., data cache 124) to processor cache 123, and then generate the digest of the target data in processor cache 123. In block 240, storage manager 120 determines whether the digest of the target data is hit in digest cache 125. If storage manager 120 determines that the digest of the target data is missing in digest cache 125, in block 245, storage manager 120 performs preprocessing (e.g., compression) on the target data. In some embodiments, if the target data has not been swapped out of processor cache 123, storage manager 120 may perform preprocessing on the target data in processor cache 123. Alternatively, if the target data has been swapped out of processor cache 123, storage manager 120 may read the target data from memory 122 (e.g., data cache 124) to processor cache 123, and then perform preprocessing (e.g., compression) on the target data in processor cache 123. As such, unnecessary preprocessing (e.g., compression) operations can be avoided as much as possible in the case of high data repetition.

Then, method 200 proceeds to block 225, where storage manager 120 stores the preprocessed target data in target storage device 130, and records the digest of the target data in digest cache 125. In block 230, the corresponding hit ratios of digest cache 125 in the plurality of time windows are updated based on the hit result of the digest of the target data in digest cache 125.

As can be seen from the above description, a solution for storing data is proposed in the embodiments of the present disclosure. The solution can compress data while calculating a digest of the data in the case of low data repetition, thereby avoiding the operation of loading the same data from a memory to a processor cache multiple times. The solution can perform processing according to the conventional procedure of compression and deduplication operations in the case of high data repetition, thus avoiding unnecessary compression operations. As such, the solution can achieve good system performance in both cases of high data repetition and low data repetition. In addition, if hardware (e.g., GPU or FPGA) supporting parallel computing is introduced to implement processor 121 shown in FIG. 1, the solution can make full use of the new hardware to perform digest calculation and data compression for the target data in parallel to further improve the system performance.

Figure 3:
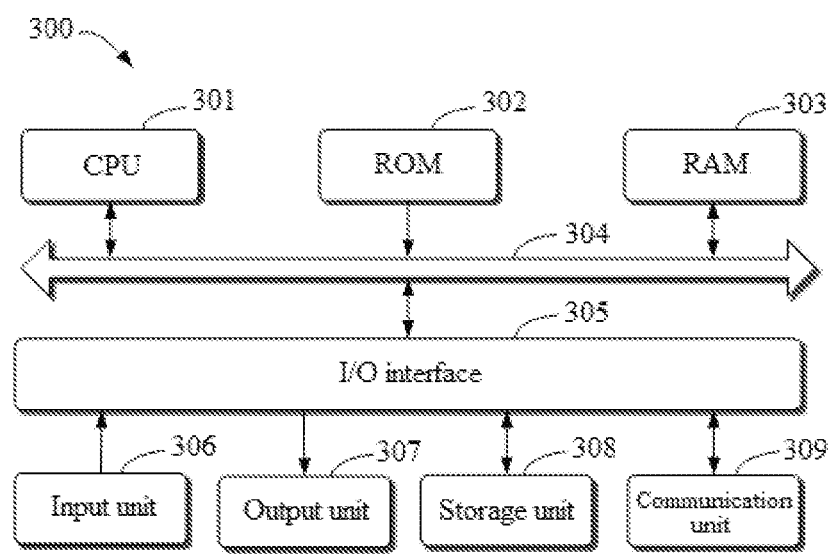
FIG. 3 is a schematic block diagram of an example device that can be configured to implement an embodiment of the present disclosure.

FIG. 3 is a schematic block diagram of example device 300 that can be configured to implement an embodiment of the present disclosure. For example, storage manager 120 as shown in FIG. 1 may be implemented by device 300. As shown in FIG. 3, device 300 includes central processing unit (CPU) 301 that can perform various appropriate actions and processing according to computer program instructions stored in read-only memory (ROM) 302 or computer program instructions loaded from storage unit 308 to random access memory (RAM) 303. Various programs and data required for the operation of device 300 may also be stored in RAM 303. CPU 301, ROM 302, and RAM 303 are connected to each other by bus 304. Input/Output (I/O) interface 305 is also connected to bus 304.

A plurality of components in device 300 are connected to I/O interface 305, including: input unit 306, such as a keyboard and a mouse; output unit 307, such as various types of displays and speakers; storage unit 308, such as a magnetic disk and an optical disc; and communication unit 309, such as a network card, a modem, and a wireless communication transceiver. Communication unit 309 allows device 300 to exchange information/data with other devices over a computer network such as the Internet and/or various telecommunication networks.

The various processes and processing described above, for example, method 200, may be performed by processing unit 301. For example, in some embodiments, method 200 may be implemented as a computer software program that is tangibly included in a machine-readable medium such as storage unit 308. In some embodiments, some or all of the computer program may be loaded and/or installed onto device 300 via ROM 302 and/or communication unit 309. When the computer program is loaded into RAM 303 and executed by CPU 301, one or more steps of method 200 described above may be implemented.

The present disclosure may be a method, a device, a system, and/or a computer program product. The computer program product may include a computer-readable storage medium having computer-readable program instructions for performing various aspects of the present disclosure loaded thereon.

The computer-readable storage medium may be a tangible device that may hold and store instructions used by an instruction-executing device. For example, the computer-readable storage medium may be, but is not limited to, an electrical storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, an RAM, an ROM, an erasable programmable read only memory (EPROM or flash memory), a static random access memory (SRAM), a portable compact disk read only memory (CD-ROM), a digital versatile disk (DVD), a memory stick, a floppy disk, a mechanical encoding device such as a punch card or a protruding structure within a groove having instructions stored thereon, and any suitable combination of the foregoing. The computer-readable storage medium as used herein is not to be interpreted as transient signals per se, such as radio waves or other freely propagated electromagnetic waves, electromagnetic waves propagated through waveguides or other transmission media (e.g., light pulses through fiber-optic cables), or electrical signals transmitted through electrical wires.

The computer-readable program instructions described herein may be downloaded from the computer-readable storage medium to various computing/processing devices or downloaded to an external computer or an external storage device over a network, such as the Internet, a local area network (LAN), a wide area network (WAN), and/or a wireless network. The network may include copper transmission cables, fiber optic transmission, wireless transmission, routers, firewalls, switches, gateway computers, and/or edge servers. A network adapter card or network interface in each computing/processing device receives a computer-readable program instruction from a network and forwards the computer-readable program instruction for storage in the computer-readable storage medium in each computing/processing device.

The computer program instructions for performing the operations of the present disclosure may be assembly instructions, instruction set architecture (ISA) instructions, machine instructions, machine-related instructions, microcode, firmware instructions, status setting data, or source code or object code written in any combination of one or more programming languages, including object-oriented programming languages such as Smalltalk, C++, etc., as well as conventional procedural programming languages such as the "C" language or similar programming languages.

The computer-readable program instructions can be executed completely on a user's computer, executed partially executed on a user's computer, executed as a separate software package, executed partially on a user's computer and partially on a remote computer, or executed completely on a remote computer or a server. In the case where a remote computer is involved, the remote computer may be connected to a user's computer through any type of networks, including an LAN or a WAN, or may be connected to an external computer (e.g., connected through the Internet by using an Internet service provider). In some embodiments, an electronic circuit, such as a programmable logic circuit, a field programmable gate array (FPGA), or a programmable logic array (PLA), may be customized by utilizing status information of the computer-readable program instructions. The electronic circuit may execute the computer-readable program instructions to implement various aspects of the present disclosure.

Various aspects of the present disclosure are described herein with reference to flowcharts and/or block diagrams of the method, the apparatus (system), and the computer program product according to the embodiments of the present disclosure. It should be understood that each block in the flowcharts and/or the block diagrams and combinations of the blocks in the flowcharts and/or the block diagrams may be implemented by the computer-readable program instructions.

The computer-readable program instructions may be provided to a processing unit of a general-purpose computer, a special-purpose computer, or other programmable data processing apparatuses, thereby producing a machine, such that when these instructions are executed by the processing unit of the computer or other programmable data processing apparatuses, an apparatus for implementing functions/actions specified in one or more blocks in the flowcharts and/or the block diagrams is generated. The computer-readable program instructions may also be stored in the computer-readable storage medium. The instructions enable a computer, a programmable data processing apparatus, and/or other devices to operate in a specific manner, so that the computer-readable medium storing the instructions includes an article of manufacture that includes instructions for implementing various aspects of functions/actions specified in one or more blocks in the flowcharts and/or the block diagrams.

The computer-readable program instructions may also be loaded onto a computer, other programmable data processing apparatuses, or other devices, such that a series of operational steps are performed on the computer, other programmable data processing apparatuses, or other devices to produce a computer-implemented process. Thus, the instructions executed on the computer, other programmable data processing apparatuses, or other devices implement the functions/actions specified in one or more blocks in the flowcharts and/or the block diagrams.

The flowcharts and block diagrams in the accompanying drawings illustrate architectures, functions, and operations of possible implementations of systems, methods, and computer program products according to multiple embodiments of the present disclosure. In this regard, each block in the flowcharts or block diagrams can represent a module, a program segment, or a portion of an instruction that includes one or more executable instructions for implementing specified logical functions. In some alternative implementations, functions labeled in the blocks may occur in an order different from that labeled in the accompanying drawings. For example, two successive blocks may actually be performed basically in parallel, or they may be performed in an opposite order sometimes, depending on the functions involved. It should also be noted that each block in the block diagrams and/or flowcharts and a combination of blocks in the block diagrams and/or flowcharts can be implemented using a dedicated hardware-based system for executing specified functions or actions, or can be implemented using a combination of dedicated hardware and computer instructions.

Various embodiments of the present disclosure have been described above, and the foregoing description is illustrative rather than exhaustive and is not limited to the disclosed various embodiments. Multiple modifications and variations will be apparent to those of ordinary skill in the art without departing from the scope and spirit of the illustrated various embodiments. The selection of terms used herein is intended to best explain the principles and practical applications of the various embodiments or the improvements to technologies on the market, or to enable other persons of ordinary skill in the art to understand the embodiments disclosed here.

The invention claimed is:

1. A method for storing data, comprising:
estimating a hit ratio of a digest cache associated with a target storage device, based at least on corresponding hit ratios of the digest cache in a plurality of time windows and corresponding weights of the plurality of time windows, wherein the plurality of time windows include i) a short time window that is a predetermined length of time preceding a current time, and ii) a long time window that extends from a time of a predetermined event until the current time, and wherein the short time window and the long time window have different corresponding weights, the digest cache recording a digest of data that is stored in the target storage device after preprocessing;
generating, in response to a determination that the hit ratio is lower than a predetermined threshold, a digest for target data to be stored and performing the preprocessing, wherein the preprocessing comprises compressing the target data, wherein generating the digest for the target data and compressing the target data are performed in parallel, wherein the generating of the digest for the target data and the compressing of the target data are both performed after reading the target data from a memory to a processor cache of a processor, and wherein generating the digest for the target data and compressing the target data are performed in parallel by hardware supporting parallel computing within the processor; and
storing, according to a determination that the digest of the target data is missing in the digest cache, the preprocessed target data in the target storage device, and recording the digest of the target data in the digest cache.

2. The method of claim 1, further comprising:
determining whether the digest of the target data is hit in the digest cache; and
updating, based on a result of the determination, the corresponding hit ratios of the digest cache in the plurality of time windows.

3. The method of claim 1, wherein generating the digest for the target data and performing the preprocessing further comprises:
reading the target data from a memory to the processor cache; and
generating, in the processor cache, the digest for the target data and performing the preprocessing.

4. The method of claim 3, wherein storing the preprocessed target data in the target storage device comprises:
flushing the preprocessed target data from the processor cache to the target storage device.

5. The method of claim 1, further comprising:
generating, according to a determination that the hit ratio exceeds the predetermined threshold,
the digest of the target data; and
performing, according to a determination that the digest of the target data is missing in the digest cache, the preprocessing on the target data.

6. The method of claim 5, wherein generating the digest of the target data comprises:
reading the target data from a memory to the processor cache; and
generating, in the processor cache, the digest of the target data.

7. The method of claim 6, wherein performing the preprocessing on the target data comprises:
reading, based on a determination that the target data is missing in the processor cache, the target data from the memory to the processor cache; and
performing, in the processor cache, the preprocessing on the target data.

8. The method of claim 1, wherein the predetermined event comprises system startup.

9. The method of claim 1, wherein the predetermined event comprises creation of a logical storage unit.

10. An electronic device, comprising:
at least one processing unit;
at least one memory coupled to the at least one processing unit and storing instructions for execution by the at least one processing unit, wherein when executed by the at least one processing unit, the instructions cause the electronic device to perform actions comprising:
estimating a hit ratio of a digest cache associated with a target storage device, based at least on corresponding hit ratios of the digest cache in a plurality of time windows and corresponding weights of the plurality of time windows, wherein the plurality of time windows include i) a short time window that is a predetermined length of time preceding a current time, and ii) a long time window that extends from a time of a predetermined event until the current time, and wherein the short time window and the long time window have different corresponding weights, the digest cache recording a digest of data that is stored in the target storage device after preprocessing;
generating, in response to a determination that the hit ratio is lower than a predetermined threshold, a digest for target data to be stored and performing the preprocessing, wherein the preprocessing comprises compressing the target data, wherein generating the digest for the target data and compressing the target data are performed in parallel, wherein the generating of the digest for the target data and the compressing of the target data are both performed after reading the target data from a memory to a processor cache of a processor, and wherein generating the digest for the target data and compressing the target data are performed in parallel by hardware supporting parallel computing within the processor; and storing, according to a determination that the digest of the target data is missing in the digest cache, the preprocessed target data in the target storage device, and recording the digest of the target data in the digest cache.

11. The electronic device of claim 10, wherein the actions further comprise:
   determining whether the digest of the target data is hit in the digest cache; and
   updating, based on a result of the determination, the corresponding hit ratios of the digest cache in the plurality of time windows.

12. The electronic device of claim 10, wherein generating the digest for the target data and performing the preprocessing comprises:
   reading the target data from the memory to the processor cache; and
   generating, in the processor cache, the digest for the target data and performing the preprocessing.

13. The electronic device of claim 12, wherein storing the preprocessed target data in the target storage device comprises:
   flushing the preprocessed target data from the processor cache to the target storage device.

14. The electronic device of claim 10, wherein the actions further comprise:
   generating, according to a determination that the hit ratio exceeds the predetermined threshold,
   the digest of the target data; and
   performing, according to a determination that the digest of the target data is missing in the digest cache, the preprocessing on the target data.

15. The electronic device of claim 14, wherein generating the digest of the target data comprises:
   reading the target data from the memory to the processor cache; and
   generating, in the processor cache, the digest of the target data.

16. The electronic device of claim 14, wherein performing the preprocessing on the target data comprises:

reading, based on a determination that the target data is missing in the processor cache, the target data from the memory to the processor cache; and
performing, in the processor cache, the preprocessing on the target data.

17. A computer program product having a non-transitory computer readable medium which stores a set of instructions to store data; the set of instructions, when carried out by computerized circuitry, causing the computerized circuitry to perform a method of:
   estimating a hit ratio of a digest cache associated with a target storage device, based at least on corresponding hit ratios of the digest cache in a plurality of time windows and corresponding weights of the plurality of time windows, wherein the plurality of time windows include i) a short time window that is a predetermined length of time preceding a current time, and ii) a long time window that extends from a time of a predetermined event until the current time, and wherein the short time window and the long time window have different corresponding weights, the digest cache recording a digest of data that is stored in the target storage device after preprocessing;
   generating, in response to a determination that the hit ratio is lower than a predetermined threshold, a digest for target data to be stored and performing the preprocessing, wherein the preprocessing comprises compressing the target data, wherein generating the digest for the target data and compressing the target data are performed in parallel, wherein the generating of the digest for the target data and the compressing of the target data are both performed after reading the target data from a memory to a processor cache of a processor, and wherein generating the digest for the target data and compressing the target data are performed in parallel by hardware supporting parallel computing within the processor; and
   storing, according to a determination that the digest of the target data is missing in the digest cache, the preprocessed target data in the target storage device, and recording the digest of the target data in the digest cache.

* * * * *